F. K. MOONEY.
AUXILIARY GAS GENERATOR FOR ENGINES.
APPLICATION FILED JULY 17, 1913.
1,098,164.
Patented May 26, 1914.
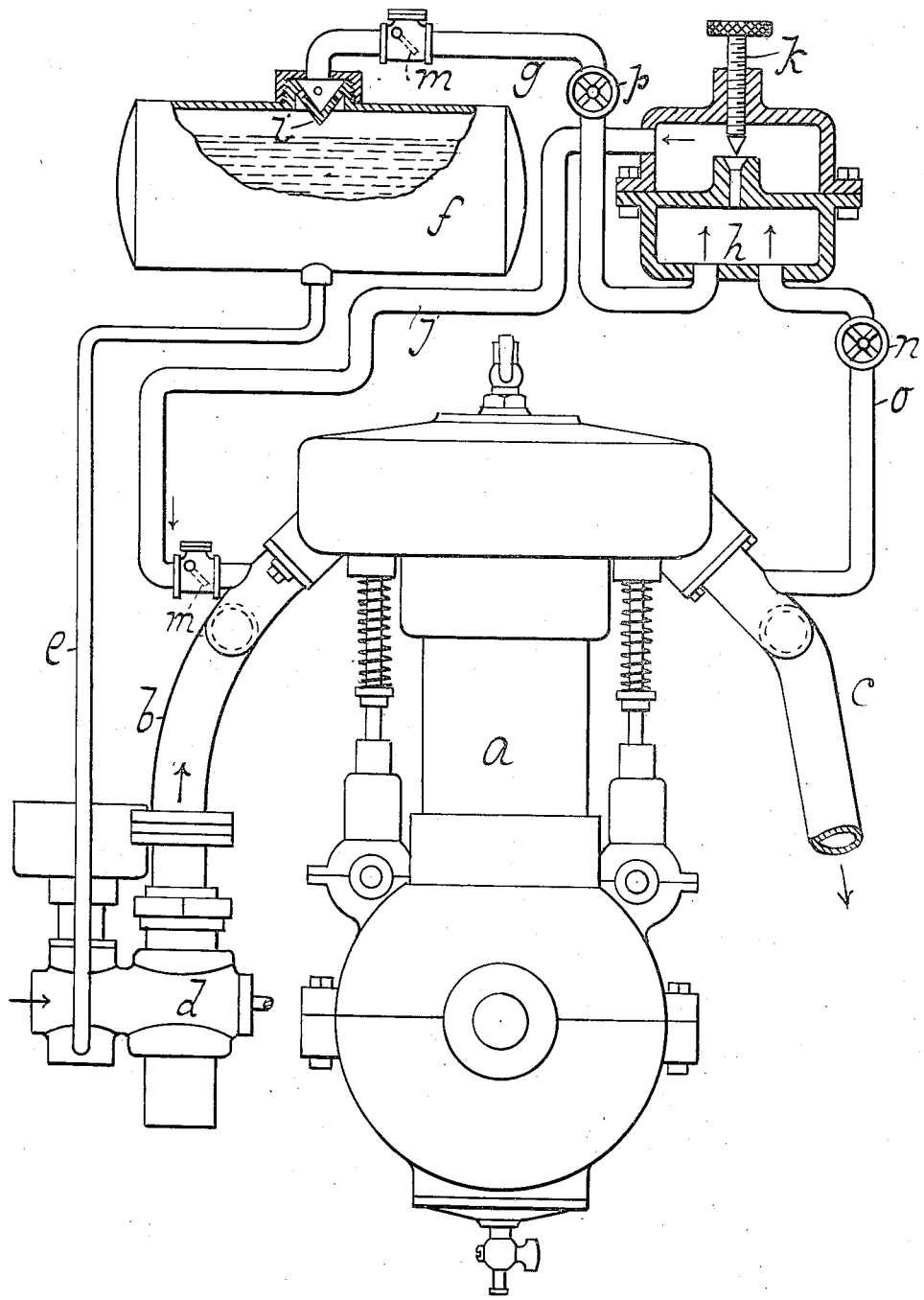
Witnesses:
William Miller
Chris. H. Almstead
Inventor
Frank K. Mooney
By his Attorneys
Hauff & Varland

UNITED STATES PATENT OFFICE.

FRANK K. MOONEY, OF KINGSTON, NEW YORK.

AUXILIARY GAS-GENERATOR FOR ENGINES.

1,098,164.  Specification of Letters Patent.  Patented May 26, 1914.

Application filed July 17, 1913. Serial No. 779,447.

*To all whom it may concern:*

Be it known that I, FRANK K. MOONEY, a citizen of the United States, residing at Kingston, county of Ulster, and State of New York, have invented new and useful Improvements in Auxiliary Gas-Generators for Engines, of which the following is a specification.

This invention relates to an auxiliary gas generator which is essentially adapted for attachment to an internal combustion engine in which a gaseous fluid such as gasolene serves as a fuel for driving the engine.

The generator consists of means whereby the gaseous fluid generated in the upper part of the gasolene tank is mixed with the products of combustion and discharged into the cylinder of the engine. A manually operated device such as a needle valve controls the mixture of gaseous fluid and the hot gases from the exhaust.

The object of the invention is to mix the hot gas from the exhaust with the vaporized fluid generated by the evaporation of the gasolene in the tank, and to inject the mixture into the cylinders with the explosive mixture.

The novel features of the invention are more fully described in the following specification and claims and illustrated in the accompanying drawing in which a diagrammatic view is shown of an engine embodying this invention.

In this drawing the letter $a$ designates an engine which is provided with an intake pipe $b$ and an exhaust pipe $c$ as is well known. The engine may have one, or as shown a series of cylinders united by a manifold intake and a manifold exhaust. A carbureter $d$ of ordinary construction is connected to the intake pipe and by means of a pipe $e$ to a fuel supply tank $f$ preferably serving as a reservoir for a liquid such as gasolene. At the upper portion of this tank is located an expansion box having connected thereto a pipe $g$ which communicates with the mixing chamber $h$ of a controlling device hereinafter described. The expansion box is provided with a perforated deflector $i$ so that any of the liquid when splashing will be thrown back into the tank and drawing of liquid into the pipe $g$ is avoided. A pipe $o$ leads from the exhaust manifold into the said mixing chamber $h$. The aeriform fluid on top of the liquid in the tank is conducted into the mixing chamber by said pipe $g$ and the product of the exhaust manifold is thoroughly mixed with the gas from the tank.

A pipe $j$ is located above the mixing chamber $h$ and it is adapted to lead the mixture of gaseous hot air and the hydrocarbon vapor from the mixing chamber to the manifold intake pipe. A needle valve $k$ controls the volume of the vapor admitted into the pipe $j$ or when necessary the valve can be entirely closed to shut off all communications with the mixing chamber and the intake. Check valves $m$ will prevent backfire from the cylinder into the gasolene tank.

The needle valve casing can be secured to any desirable object on an automobile, for instance on the dashboard where it is within reach of the operator of the car.

It will be readily understood that the auxiliary gas producing arrangement cuts down and at the same time regulates the suction of the carbureter caused by the piston of the engine. It is well known that the suction of the piston operates the valve of the carbureter, and at the same time by arranging the auxiliary gas producing devices as shown the gas from the tank will combine with the hot exhaust gases and be exploded in the cylinder.

The generator is designed to economize the use of the main supply of gasolene from the tank by cutting down the suction of the carbureter.

A valve $n$ is mounted on the pipe $o$ for controlling the supply of exhaust gas from the exhaust manifold to the mixing chamber. A valve $p$ likewise governs the flow of vaporized gas from the tank $f$ into the said mixing chamber. If too much exhaust gas is allowed to enter the mixing chamber it would overcome the suction on the vaporized gasolene. It is well known that the exhaust gas has pressure to it and the vaporized gas is drawn in with the suction on the intake manifold.

I claim:—

1. In a gas generator the combination with an internal combustion engine, including an intake, a carbureter connected to the intake, an exhaust, and a gaseous fuel supply tank communicating with the carbureter; a controlling box provided with a mixing and an outlet compartment, pipes leading from the supply tank and the exhaust to one of the compartments, a pipe leading from the other compartment to the intake, and means applied to the compartments for controlling the mixture.

2. In a gas generator the combination with an internal combustion engine, including a manifold exhaust, a manifold intake, a carbureter connected to the intake, and a gaseous fuel supply tank communicating with the carbureter; a controlling box provided with a mixing and an outlet compartment, pipes leading from the supply tank and the exhaust to the mixing compartment, a pipe leading from the outlet compartment to the intake, and a needle valve for controlling the product from the mixing compartment to the outlet.

In testimony whereof I have hereunto set my hand in the presence of two subscribing witnesses.

FRANK K. MOONEY.

Witnesses:
    ALONZO TERPENINY,
    EDWARD F. MALIO.